KENNETH F. RUSSELL
INVENTOR.

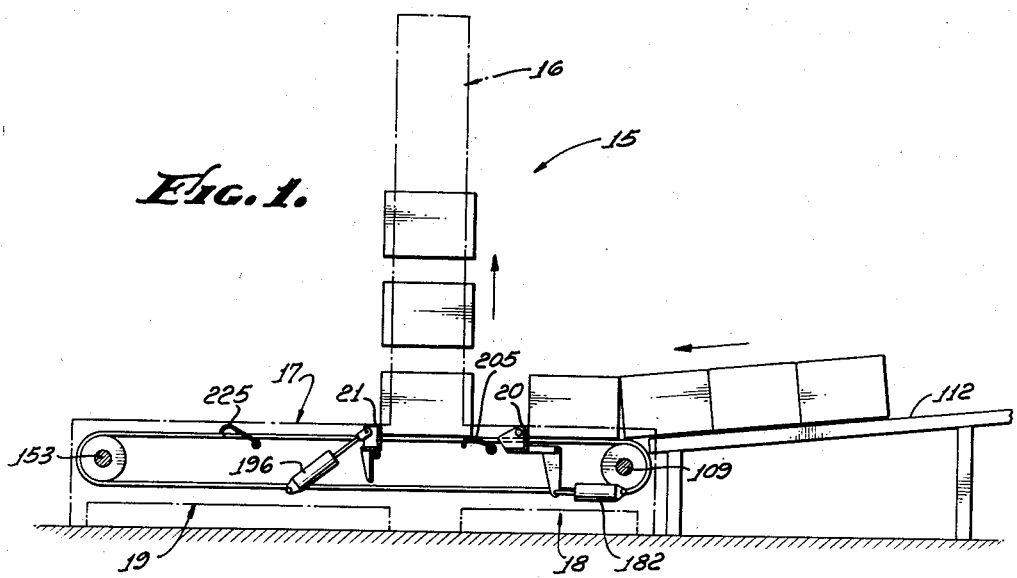
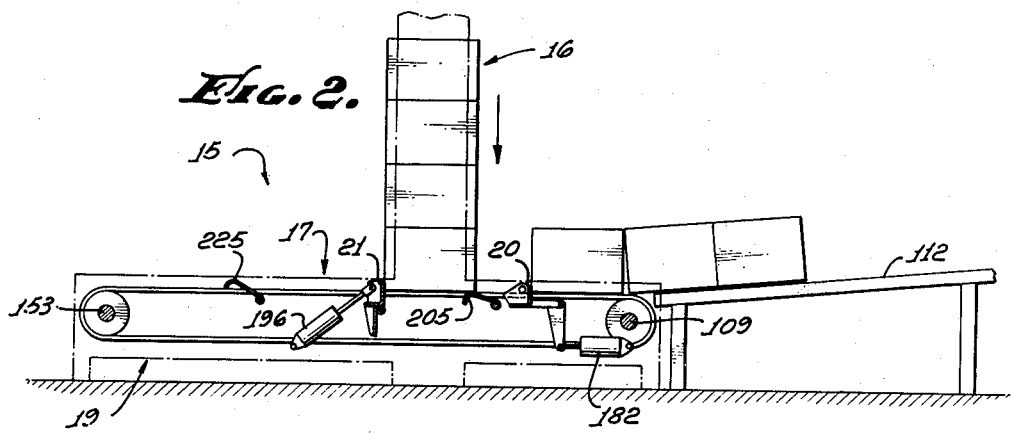
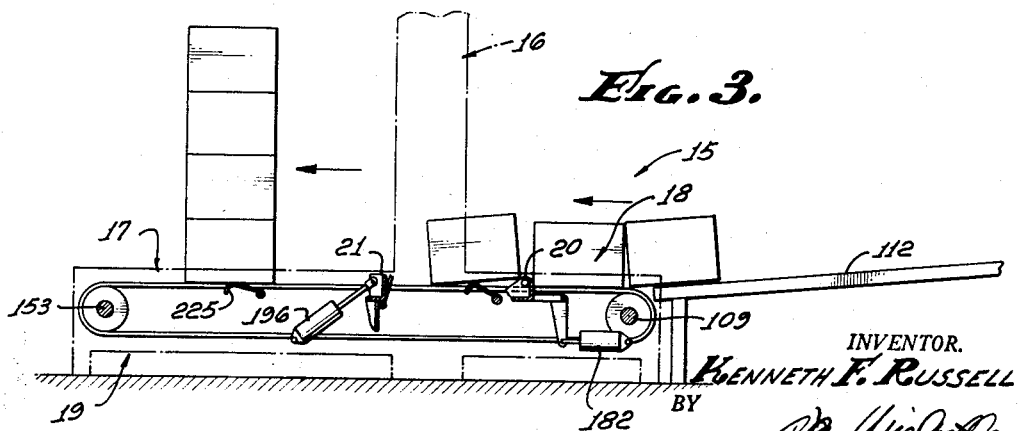

BY
ATTORNEY.

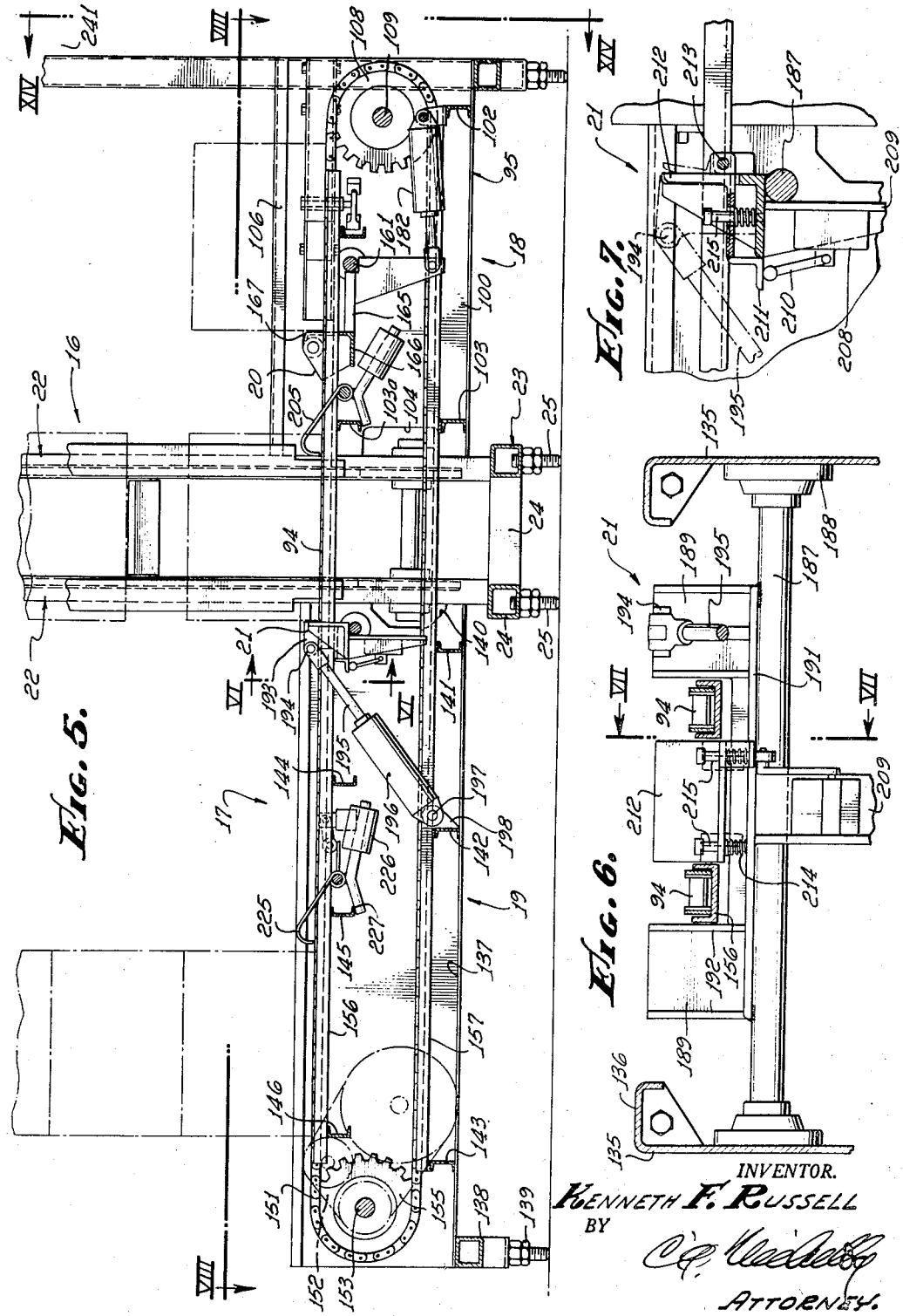

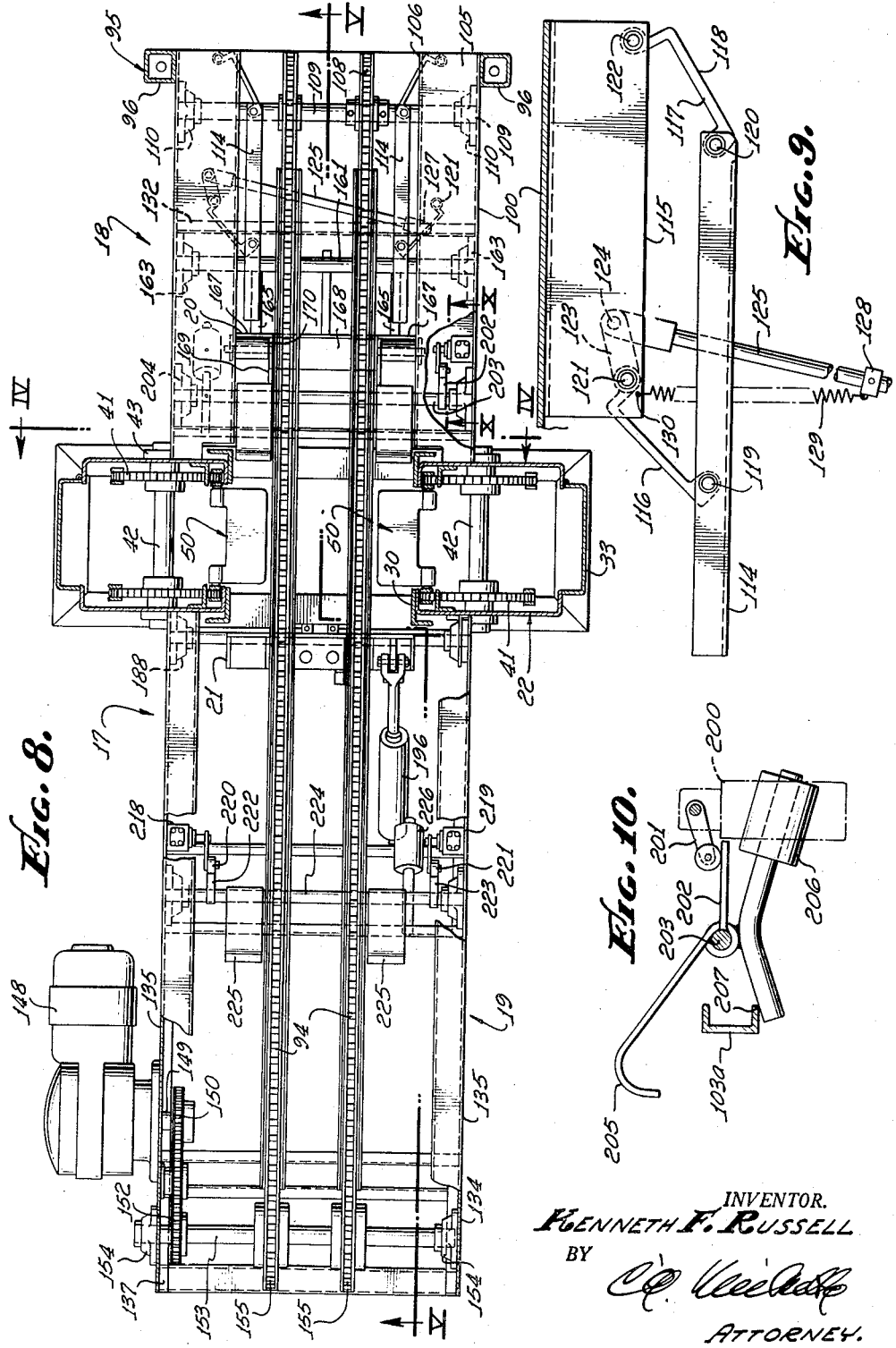

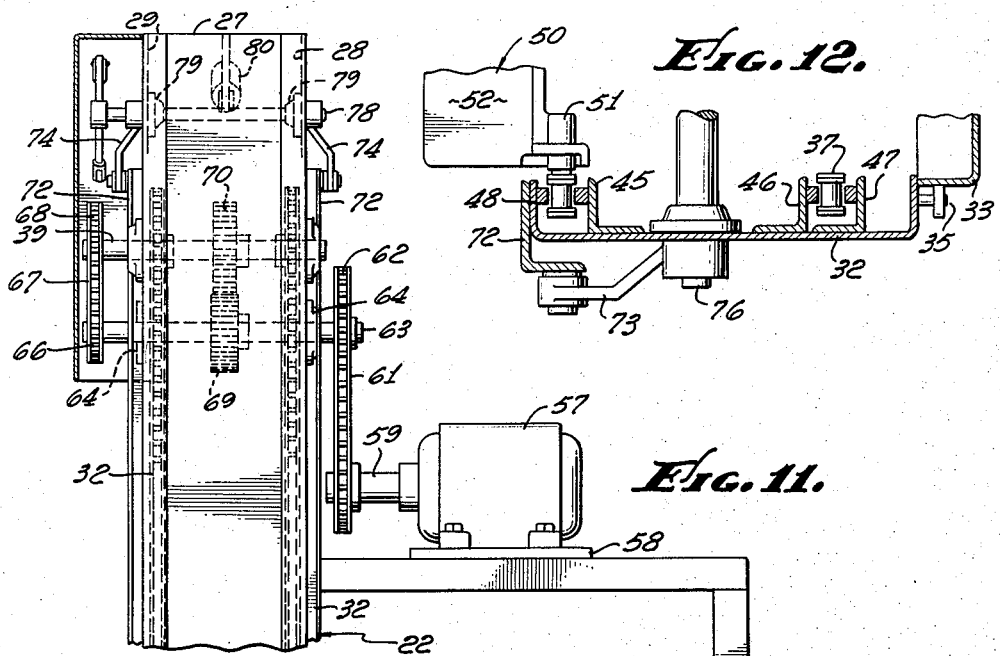
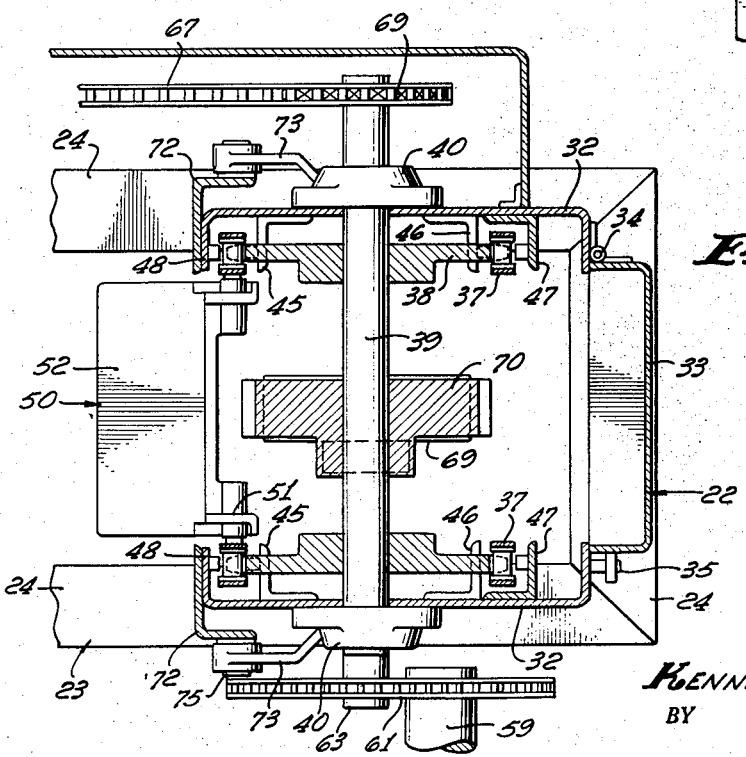

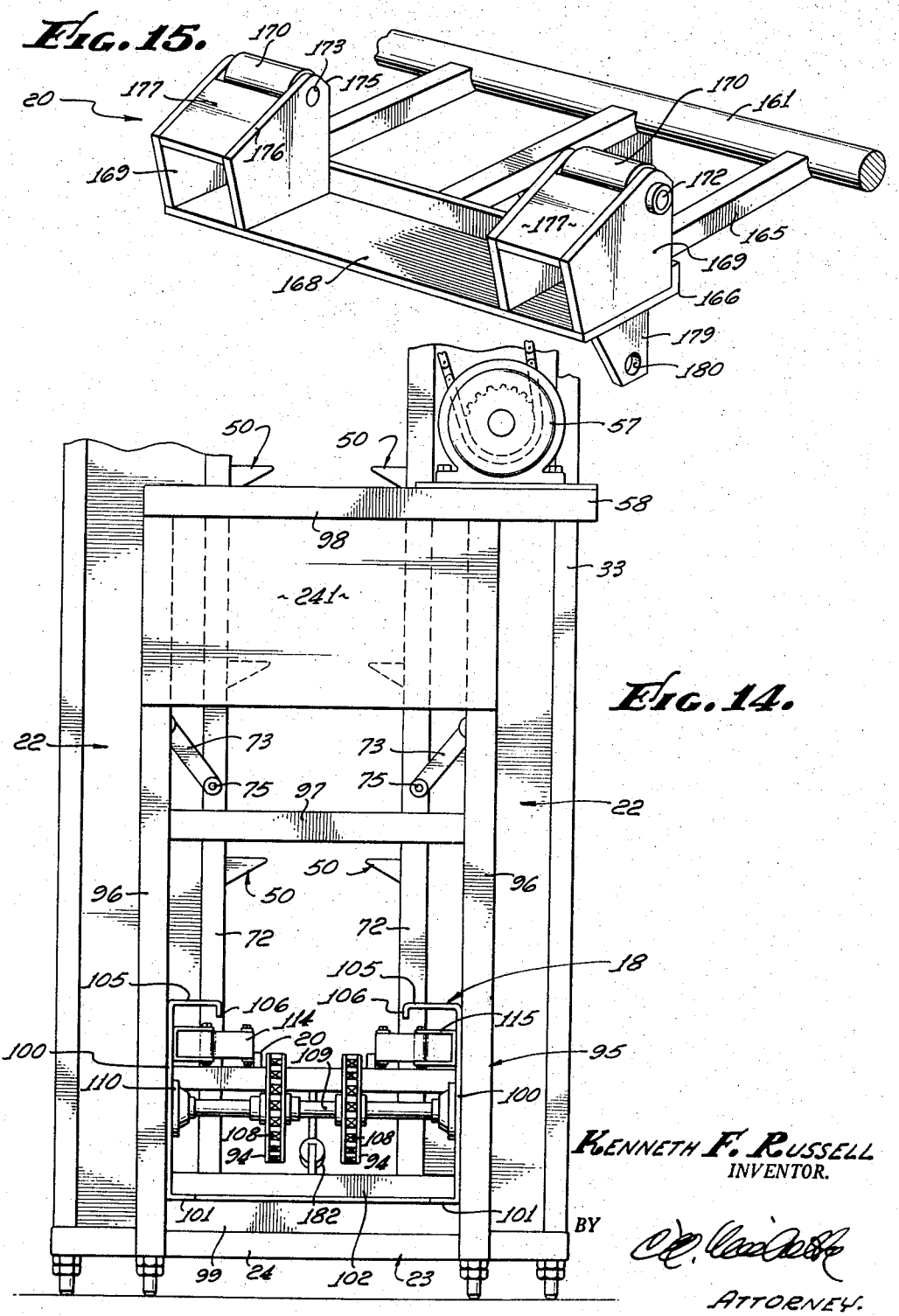

United States Patent Office 2,948,382
Patented Aug. 9, 1960

2,948,382

BOX STACKING MECHANISM

Kenneth F. Russell, Pomona, Calif., assignor to Pomona Foundry, Inc., Pomona, Calif., a corporation of California Filed Dec. 4, 1956, Ser. No. 626,178

21 Claims. (Cl. 198—35)

The invention relates to a stacking mechanism for articles such as boxes, cartons, containers and the like and more particularly to an improved compact construction for handling such articles to form a stack thereof in a rapid, yet gentle manner.

This invention relates to improvements of certain features of a stacking mechanism disclosed and claimed in a co-pending application Serial No. 429,256 filed May 12, 1954, now Patent No. 2,897,949.

Prior proposed stacking mechanisms (other than that described in the co-pending application) have included complex means for handling boxes, said handling means occupying considerable space and providing movement or travel of the boxes along a selected relatively long path into, through and out of said stacking mechanism to form a stack of boxes. Since the distance traveled by a box was great, the time spent by a box in the machine was also relatively great. Attempts to move boxes at increased speed to reduce this time factor only resulted in rough handling of such boxes and inaccurately formed stacks. Rough handling of such boxes with consequent damage or undesirable disturbance of the contents of the boxes made such prior proposed stacking mechanism unsatisfactory when operated at the speed required for efficient handling of the boxes.

This invention relates to a stacking mechanism of compact construction in which the length of path of travel of a box into, through and out of the stacking mechanism is reduced to a minimum. As a result, boxes stacked by a mechanism of the present invention may move at a somewhat slower speed along said path and may be relatively gently handled so as to avoid damage or disturbance to the contents of the boxes. At the same time, the compactness of the stacking mechanism of this invention and the reduced length of travel of boxes therein results in a greater number of boxes being stacked per minute.

As in the said copending application, the stacking mechanism of this invention includes an upstanding frame means providing a single vertical stack pathway for boxes to be accumulated in spaced relation, said boxes entering a receiving station in said stack from a short infeed pathway. A stack is formed when a selected number of boxes are accumulated in spaced relation in the stack pathway be moving said boxes toward one end of the pathway so as to form a stack by superimposing one box upon another box. After such a stack of boxes is formed, the stack is discharged through a stack discharge opening provided in the frame means.

The present invention is particularly directed to the means for intermittently feeding discrete boxes to the receiving station, the last box fed to said station remaining at said station without any movement thereof until the preceding boxes are stacked thereon. After the stack is formed, the stack is discharged with the bottom box thereof traveling in the same plane as that in which it was resting while the stack was formed.

The present invention also contemplates means for controlling movements of a box along a path of travel into and through the stacking mechanism so that when boxes are positioned for movement out of the receiving station, said boxes will be accurately vertically aligned with respect to their front and rear walls, such control means being so arranged that each box is gently positively longitudinally positioned in the receiving station.

The main object of the present invention is to disclose and provide a stacking mechanism of compact novel construction.

An object of this invention is to disclose and provide a stacking mechanism provided with a single, continuously moving through conveyor means provided with a relatively short infeed section and outfeed section.

Another object of this invention is to disclose and provide such a stacking mechanism wherein the last box of a stack to be formed is moved in only a linear path in a horizontal plane and its movement along said path is interrupted intermediate ends thereof for a length of time sufficient to stack a selected number of preceding boxes thereupon.

A further object of this invention is to disclose and provide a stacking mechanism provided with novel control means for selectively controlling the movement of boxes into and through said stacking mechanism.

A more particular object of this invention is to disclose and provide a stacking mechanism wherein said above control means is arranged to obviate bouncing or back slippage of each box as it is moved into a receiving station for formation of a stack.

A still further object of the invention is to disclose and provide a stacking mechanism wherein its compact construction and means to control movement of a box therein is efficiently arranged so that the speed of stacking of boxes may be increased without rough handling of said boxes.

Many other objects and advantages of this invention will be readily apparent from the following description and drawings in which an exemplary embodiment of this invention is shown.

In the drawings:

Fig. 1 is a diagrammatic elevational view of a stacking mechanism embodying this invention with boxes being fed thereto and elevated thereby.

Fig. 2 is a view similar to Fig. 1 showing formation of a stack of boxes.

Fig. 3 is a view similar to Fig. 1 showing a stack being discharged and commencement of a second stacking cycle.

Fig. 5 is a fragmentary sectional view taken in the longitudinal planes indicated by line V—V of Fig. 8.

Fig. 6 is a transverse sectional view taken in the plane indicated by line VI—VI of Fig. 5.

Fig. 7 is a sectional view taken in the plane indicated by line VII—VII of Fig. 6.

Fig. 8 is a top view partially in section taken in a transverse horizontal plane indicated by line VIII—VIII of Fig. 5.

Fig. 9 is a fragmentary top plan view of one side of the stack centering means in the infeed section of the stacking mechanism.

Fig. 10 is a longitudinal fragmentary sectional view taken in a vertical plane indicated by line X—X of Fig. 8.

Fig. 11 is a fragmentary top side view taken from the plane indicated by line XI—XI of Fig. 4.

Fig. 12 is a fragmentary horizontal transverse sectional view taken in the plane indicated by line XII—XII of Fig. 4.

Fig. 13 is a fragmentary transverse horizontal sectional view taken in the plane indicated by line XIII—XIII of Fig. 4.

Fig. 14 is an elevational front view taken from the vertical view taken in the plane indicated by line XIV—XIV of Fig. 5.

Fig. 15 is a perspective view of a first gate means in the infeed section of the stacking mechanism.

Figure 4:
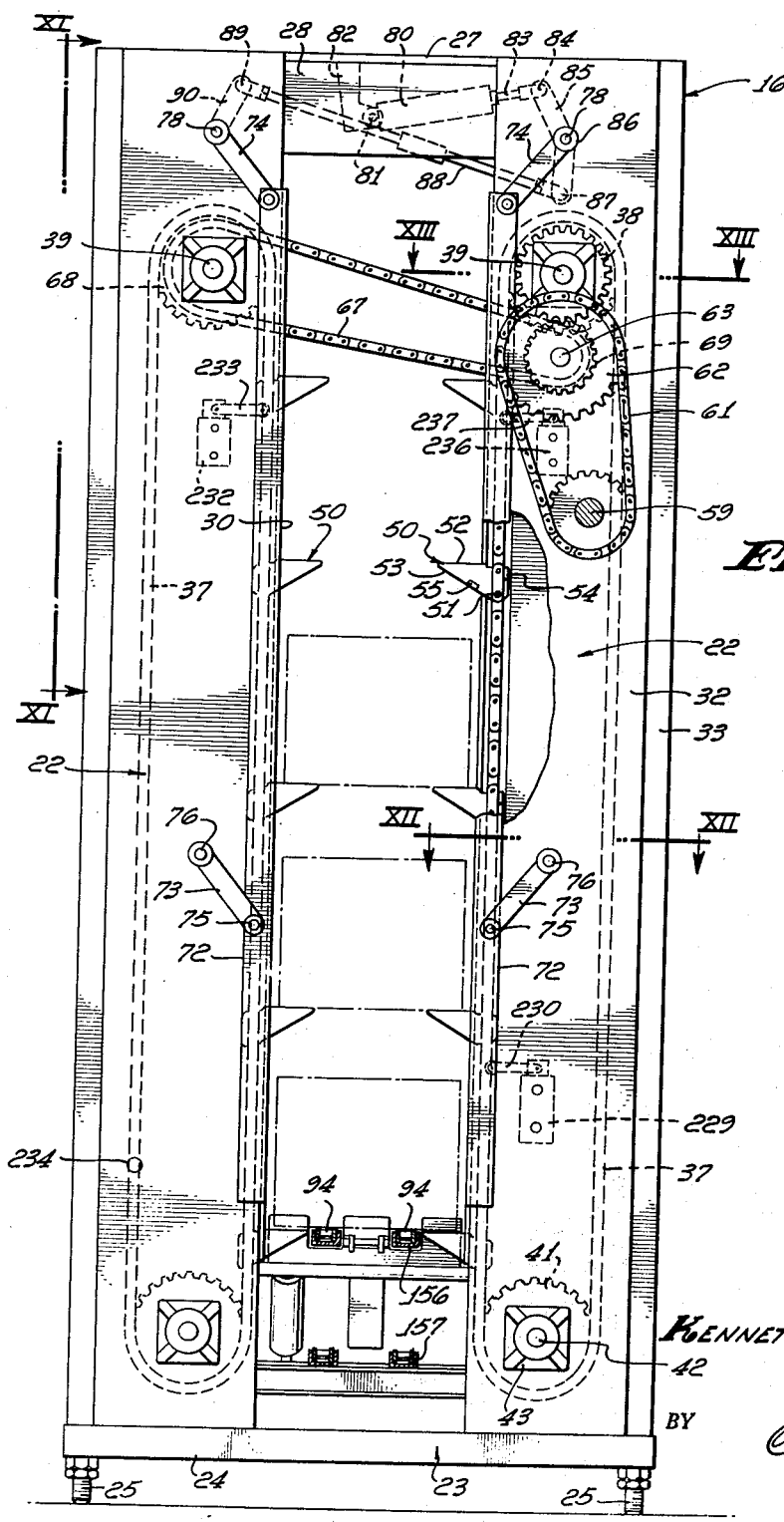
Fig. 4 is an elevational view taken in a vertical transverse plane just forward of a stack frame means of a stacking mechanism embodying this invention, the plane being indicated by line IV—IV of Fig. 8.
Figure 16:
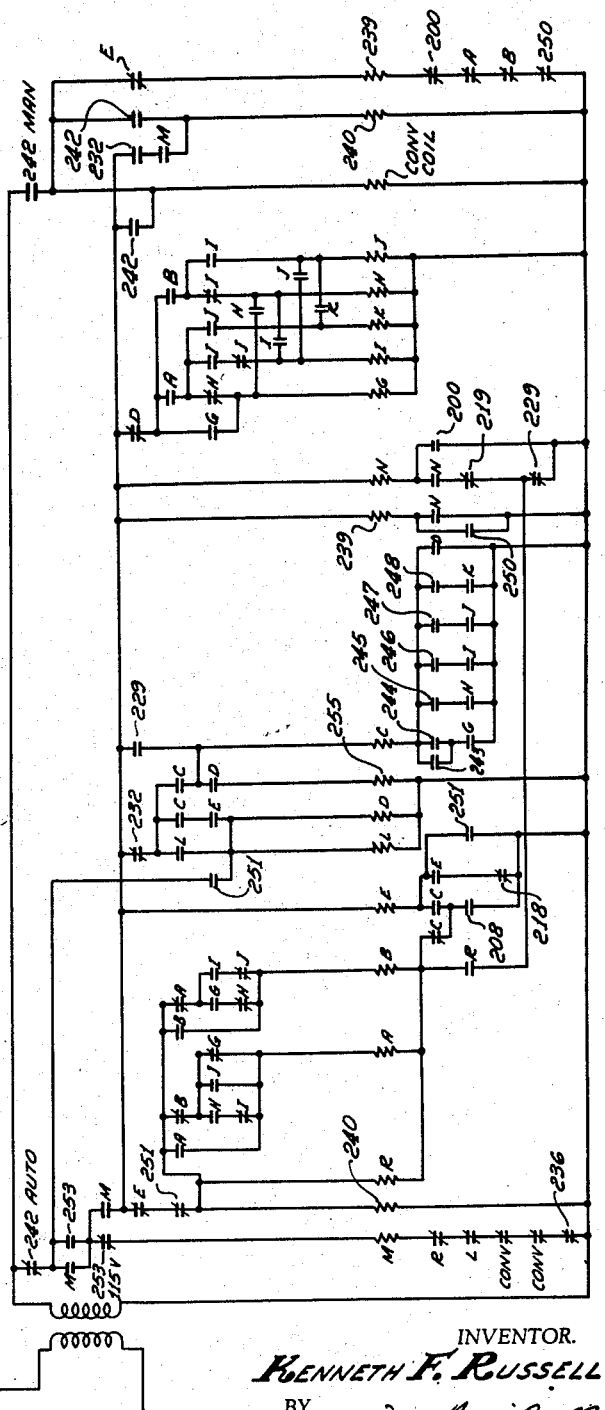
Fig. 16 is a schematic wiring diagram for operation of said stacking mechanism.

Generally speaking, a stacking mechanism indicated at 15 may comprise an upstanding stack frame means 16 providing a single vertical stack pathway, a single continuously moving conveyor means generally indicated at 17 extending through the bottom of the stack frame means and having an infeed section 18 and an outfeed section 19, and means to control movement of boxes along the infeed pathway formed by the infeed section, along the stack pathway, and along the outfeed pathway formed by said outfeed section. The control means includes control structure including a pair of longitudinally spaced gates 20 and 21 on the conveyor means and electrically controlled actuating means.

It will be noted from a consideration of diagrammatic Figs. 1 to 3 inclusive that boxes fed to the stacking mechanism are moved in pathways which result in a minimum length of pathway and minimum handling; that is, with respect to stopping and changes in direction of movement of said boxes. Briefly, a box entering infeed section 18 is initially moved along the infeed path of the stacking mechanism over gate 20 to the bottom end of a vertical stack pathway and positioned by gate 21. The movement of succeeding boxes from their initial restrained position against gate 20 to a receiving station at the bottom end of the stack pathway is less than twice the length of a box. The box is then lifted vertically above the infeed path and along the stack path. When a selected number of boxes is accumulated, the boxes are reversed in their direction of movement and move downwardly to form a stack supported upon the last box admitted to the receiving station. The last box is not vertically moved from the receiving station and remains at the end of the infeed pathway while the stack is formed. The stack of boxes is released by retraction of gate 21 and then discharged by movement along the outfeed pathway formed by the outfeed section 19. Thus a box being stacked by a mechanism of this invention is moved horizontally a short distance, lifted vertically a selected distance, lowered along the same path and then moved horizontally again out of the stacking zone, the total overall path length from gate 20 to the ultimate position of a box in a stack being reduced to a minimum.

The stack frame means 16 is similar to that disclosed in said copending application and is constructed to provide a single vertical stack pathway for accumulation of a plurality of boxes in spaced relation. The stack frame means 16 comprises a pair of upstanding vertical columns 22 in spaced parallel relation and arranged laterally of the direction of movement of boxes into the stacking mechanism. The spaced columns 22 may be interconnected at their bottoms by a rectangular base 23 formed of box-section front, rear, and side members 24. At each corner of base 23 may be provided vertically adjustable shoes 25 for accurate leveling of the stack frame. The top of said columns 22 may be interconnected by a top wall 27 and front and rear walls 28 and 29. A stack discharge opening 30 is provided at the rear of said columns, it being understood that the front of the stack frame means faces the direction of incoming boxes.

Each column 22 may comprise a pair of parallel oppositely facing channel members 32 secured at their bottom as by welding to base 23 and at their top to top wall 27 and front and rear plates 28, 29. The outer side face of said columns may be provided with an elongated vertical column side door 33 hinged as at 34 to one channel 32 and provided with bolt fastening means 35 cooperable with the other channel 32. Side doors 33 provides ready access to the interior of each column.

Elevator means for intermittently raising boxes in spaced relation to accumulate said boxes in the stack path may comprise a pair of endless elevator chains 37 provided in each column 22, said pair of chains 37 being carried by a pair of top sprockets 38 mounted on a common sprocket shaft 39 journaled in suitable bearings 40 secured to channels 32. Adjacent the bottom of each column 22 a pair of bottom sprockets 41 may be mounted on a common sprocket shaft 42 which is journaled in suitable bearings 43 secured to the lower portions of channels 32. Each channel 32 of each column 22 may include vertically extending parallel chain-confining or guide members 45, 46 and 47 of angle section. Member 45 may cooperate with the inboard flange 48 of a channel 32 to provide a longitudinally extending pathway for guiding the inboard lay of an elevator chain 37. The guide members 46 and 47 extend only over the medial portion of each column and provide guide means for the outboard lay of the chain means. The inboard lays of the chain means in said columns 22 move together in the same direction.

The elevator chain means 37 in each column 22 carry transversely aligned box support members 50 or box flights which may be pivotally mounted as at 51 on each of the endless chain means 37 within a column 22. Each box support member 50 includes a flat relatively wide box support top face 52 and a downwardly and outwardly inclined face 53 for engagement with the top of a box as described later. The box support members 50 are pivotally hung as at 51 about a pivot point spaced below the plane of box support face 52 and are normally positioned by gravity in box-supporting position. In such box supporting position each member 50 is provided with a lug 54 at each side adapted to engage the adjacent face of chain 37. When box support members 50 are moved around a sprocket so as to be positioned on the outboard lay of a chain 37, gravity positions said box support members in a downwardly hanging position and a stop lug 55 on each side of the box support member 50 may contact the adjacent portion of chain 37 to limit pivotal movement of member 50.

Box support members 50 carried by pairs of chain means 37 in said spaced columns 22 are aligned horizontally so as to support a box therebetween. The width of the top faces 52 of said box supports 50 adapts said elevator means to boxes of different width. The box support members 50 are vertically spaced apart a distance which is greater than the height of a box to be stacked by the stacking mechanism. The vertical spacing is such that boxes of widely variant differing heights may be stacked in the present stacking mechanism.

Means for driving the pairs of elevator chain means 37 may comprise an electrical motor means 57 supported on a platform 58 at the front of the stacking mechanism and adjacent the top of the columns 22. The motor 57 has a motor shaft 59 which is provided with a pulley adjacent column 22 for receiving a pulley chain 61, the other end of which is carried by an enlarged pulley 62 carried by a transverse shaft 63 supported in channels 32 by bearings 64. The other end of shaft 63 carries a pulley 66 which carries the one end of a pulley chain 67 which extends to the other column 22 and is carried by a pulley 68 mounted on top sprocket shaft 39. The elevator chain means 37 in column 22 which carries the transverse shaft 63 is driven in synchronism with chain means 37 by means of a drive gear 69 carried by shaft 63 between channels 32. Drive gear 69 meshes with a sprocket gear 70 carried by top sprocket shaft 39 of the elevator chain means 37.

The stack frame means 16 is also provided with stack alignment means for laterally aligning a stack of boxes as the stack is being formed. The alignment means may comprise a pair of elongated vertical extending alignment members 72 of angle section embracing front and rear vertical inboard edges of each column 22. Each pair of alignment members 72 may extend for almost the entire height of column 22 and may be pivotally supported by a pair of vertically spaced diagonal links 73 and 74. Bottom link 73 is pivotally connected to a channel member 72 at 75 and to a through rod 76 which interconnects the pair of bottom links 73 on each column 22. Top links 74 are fixedly mounted to an interconnecting shaft 78 mounted in journals 79 carried by channels 32 above sprocket shaft 39.

Means for simultaneous actuation of alignment members 72 to move said alignment members inwardly to squeeze a stack of boxes into lateral alignment may comprise a double acting hydraulic cylinder and piston means 80 having one end pivoted at 81 to a depending bracket 82 secured to top wall 27 between columns 22. Piston rod 83 is pivotally connected at 84 to a bell crank lever 85 fixed to shaft 78 intermediate its ends as at 86. Bell crank lever 85 extends below connection 86 for pivotal connection at 87 to a connecting rod 88 which is pivotally connected at 89 to a lever 90 fixed to shaft 78 mounted on the other column 22. Connecting rod 88 may be provided with adjustment means to vary its length. It will thus be apparent that when piston rod 83 is urged outwardly, bell crank 85 turns shaft 78 clockwise as seen from Fig. 4 to cause the pair of alignment members 72 on one column 22 to be lifted upwardly and inwardly toward boxes carried by box support members 50. The lower end of bell crank 85 is likewise moved clockwise, such movement being transmitted through rod 88 to lever 90 and causing the opposite shaft 78 to rotate in a counterclockwise direction as viewed in Fig. 4. Such counterclockwise rotation causes the opposite pair of channel members 72 to be urged inwardly against the opposite side of boxes supported by box support members 50.

The sequence of actuation of the elevator chain means and box alingment means will be described hereinafter. The above described arrangement of the stacking frame, the elevator chain means and the box alignment means is similar to that shown in the aforesaid copending application.

The present invention is particularly directed to the stack frame means, elevator means and box alignment means described above in combination with a novel single continuously moving conveyor means generally indicated at 17. The conveyor means 17 comprises a pair of endless through-conveyor chains 94 which interconnect the infeed and outfeed sections 18 and 19 of the conveyor means. The infeed section 18 includes a frame section generally indicated at 95 comprising a pair of laterally spaced front columns 96 which extend upwardly for support of platform 58. The columns 96 may be interconnected by a plurality of transverse frame members 97, 98, and 99. Extending horizontally from each of columns 96 may be an elongated, generally rectangular side plate 100 having an inturned bottom flange 101 secured as by welding to cross member 99. Adjacent columns 96, side plates 100 may be interconnected by transverse channel section member 102 and adjacent their opposite ends, side plates 100 may be interconnected by cross channel members 103 and 103a. The edge of side plate 100 remote from columns 95 may be provided with a recess 104 to facilitate connecting plate 100 to a column 22. Each side plate 100 may also include an inturned top flange 105, the flanges 105 being provided with downturned lips 106 spaced apart a sufficient distance to permit passage therebetween of boxes of maximum width.

The infeed end of conveyor chain means 94 may be supported on chain sprockets 108 carried by a shaft 109 which may be mounted in journal means 110 carried by side plates 100 adjacent columns 95. Side plates 100 may be provided with horizontal spaced slots 111 providing horizontal adjustable mounting of journal means 110, to facilitate mounting of the chain means 94.

The front end of infeed section 18 may be associated in any convenient manner with an incoming conveyor means 112 which in this example may comprise an inclined gravity feed of any well known manufacture so as to provide an accumulation of boxes in end-to-end abutting relation which will slide by gravity onto the infeed end of conveyor chains 94.

Means for centering said boxes as they are received from the gravity feed 112 may comprise a pair of laterally spaced apart parallel horizontal, longitudinally extending channel section guide members 114. Each member 114 is pivotally connected in parallelogram fashion to a U-section elongated mounting bracket 115 secured to side plate 110 in any convenient manner, said pivotal connections comprising a pair of longitudinally spaced links 116 and 117 of similar construction, except that in mounting, link 117 is reversed so as to present a diagonal inwardly directed face 118 to facilitate guiding of a box centrally between the guide members 114. Links 116 and 117 may be pivotally connected to guide members 114 at their inner ends as at 119 and 120 respectively, and at their outer ends to bracket 115 as at 121 and 122 respectively.

Means for biasing said guide members 114 inwardly may comprise a forwardly extending link 123 fixed at one end to the pivot pin at 121 and pivotally connected at 124 to a diagonal horizontal transversely extending adjustment rod 125, the opposite end of which may be pivotally connected at 126 to one end of a link 127 fixed to the pivot pin providing pivotal connection 121 for the opposite link 116. The rod 125 carries intermediate its ends an adjustable collar 128 which provides a connection to one end of a tension spring 129, the other end of said tension spring being fixed at 130 to bracket 115. By adjustment of the length of rod 125 and of collar 128 thereon, it will be readily apparent that the biasing action of guide members 114 against sides of a box may be regulated so that a box received therebetween will be centered on the center line of the infeed section. Means to limit inward movement of guide members 114 may comprise stop lugs 131 secured to a transverse member 132 interconnecting side plates 100 intermediate their ends.

The outfeed section 19 of the single conveyor means 17 may comprise an outfeed frame means 134 extending from the rear face of the stack frame means 16 and in alignment with infeed section 18. The outfeed frame means 134 may comprise a pair of spaced channel side plates 135 having top and bottom inturned flanges 136 and 137. The end of side plates 135 remote from the stack frame means may be supported by a base 138 formed of box section and having vertically adjustable shoes 139 for leveling of the outfeed section. The end of plates 135 adjacent the stack frame 16 may be provided with a recess 140 to facilitate connection and securement to the stack frame means in any suitable manner. Bottom transverse members 141, 142 and 143 of channel section interconnect side plates 135. Top transverse members 144, 145 and 146 of channel section likewise interconnect side plates 135.

Drive means for the conveyor means 17 may comprise an electrical motor 148 secured to one of the side plates 135, said motor 148 having an inwardly extending motor shaft 149 which carries a drive gear 150 which may mesh with a chain 151. Chain 151 may mesh with a driven gear 152 carried by a transverse shaft 153 supported in journal means 154 carried by the side plates 135. Shaft 153 carries a pair of spaced sprockets 155 for engagement with the outfeed end of chain means 94.

Guide means for supporting top and bottom lays of the pair of conveyor chains 94 may comprise top channel bars 156 and bottom channel bars 157 which extend from the front of the infeed section 18 to the rear of the outfeed section 19 so that said conveyor chains 94 are continuously supported throughout their length and provide a non-yieldable means for supporting boxes thereon.

Means for controlling the movement of boxes along the infeed pathway, the stack pathway, the outfeed pathway, may comprise the pair of longitudinally spaced gate means 20 and 21 and a plurality of limit switch means for selective actuation of said gate means and said elevator means. The arrangement of limit switch means will be dsecribed later.

The first gate means 20 is positioned in the infeed pathway at the discharge end of the box centering means for the purpose of separating boxes and to hold boxes on the infeed path. Gate 20 is best shown in Figs. 5 and 6 and includes a transverse shaft 161 pivotally mounted in journal means 163 carried on the inner faces of side plates 100 adjacent transverse member 132. The shaft 161 is secured as by welding at 164 to ends of longitudinally extending bars 165 which are secured at their opposite ends to an angle section transverse member 166. Transverse member 166 includes a spaced upstanding transverse wall 167 and an interconnecting horizontal rearwardly extending wall 168. A pair of upstanding spaced longitudinally extending walls 169 connect walls 167 and 168, and provide support for a transverse roller 170. Roller 170 may be mounted on antifriction bearing means 171 supported from a transverse axle 172 which extends into aligned ports 173 provided in walls 169. The top of each wall 169 forwardly of the pivot axis of roller 170 may be provided with a top downwardly inclined edge 175. Extending forwardly from said pivot axis, wall 169 may be provided with a forwardly and downwardly inclined top edge 176. The spaced walls 169 may be interconnected by a transversely extending top plate 177 providing a top surface in alignment with edges 176. At the center portion of pivot member 161 may be secured a depending lever 179 provided with a connection at 180 to an end of a piston rod 181. The piston rod 181 is associated with a double acting air cylinder 182 pivoted at its opposite end at 183 to an upstanding bracket 184 carried by bottom transverse member 102.

In closed position of gate 20, the upper portions of walls 167 extend above the top of chain means 94 for abutment with a box advanced by said chain means. In retracted gate open position the top of walls 167 lie below the plane of the top lay of the conveyor chains so as to permit passageway of a box thereover. The inclined edges 176 and top surface of plate 177 are adapted to engage the trailing end of a box when gate 20 is returned to closed position so as to effect separation of adjacent boxes and to afford intermittent spaced feeding of boxes into the stack path as later described.

The second gate 21 of said pair of gate means is best seen in Figs. 6 and 7. Gate 21 is pivotally mounted by a pivot member 187 at the front end of outfeed section 19 and is positioned just outwardly of the stack frame means 16. The ends of said pivot member 187 may be mounted in bearing means 188 secured in any suitable manner to the side plates 135. Gate 186 includes transversely spaced upstanding side gate portions 189 carried by a transverse horizontal plate 191 secured as by welding to pivot member 187. The upstanding gate portions 189 project above the top plane of the conveyor chain means in normal closed position of gate 186. Each side gate portion 189 includes a pair of triangular forwardly extending walls 192 and between the walls of one gate portion 189 may be provided a centrally disposed bracket 193 having a pivotal connection at 194 to the upper end of an upwardly inclined piston rod 195 of a double acting air cylinder means 196. The cylinder means 196 may be pivotally connected at 197 to a bracket 198 secured to transverse member 142 on the outfeed section.

The gate 21 is normally closed by the cylinder means 196 and serves to precisely longitudinally position a box at the end of its movement along the infeed path and at the bottom end of the stack path. The position of gate portions 189 from the center of the stack path is such that boxes of minimum length will be fully supported by box support members 50 on the elevator chain means, yet positioning of boxes of maximum length on said support means will be permitted without unbalance thereof.

Limit switch means are provided adjacent said pathways for controlling action of said gates 20 and 21 and said elevator means. Conveyor limit switch means 200 (Figs. 8 and 10), to control gate 20 includes switch lever 201 contacted by arm 202 carried adjacent one end of transverse rod 203 pivotally mounted in bearing 204 carried by side plates 100. A box contact element 205 is mounted centrally of rod 203 and of the conveyor and normally projects above the top lay of chains 94 so as to be contacted and depressed by a box just as the box enters the lower end of the stack pathway defined by the stack frame. Box contact element 205 is maintained in up position by a counterweight means 206 hung from the other end of rod 203, one end of said counterweight means normally resting against channel 103a as at 207 to position the box contact element 205.

At the end of the infeed pathway and the bottom of the stack pathway is provided gate limit switch means 208 operable to actuate the elevator means upwardly when a box is stopped by abutment with gate 21. Gate switch means 208 is carried by a depending bracket 209 secured to member 191 centrally of gate means 21. The gate switch means 208 includes arm 210 adapted to be contacted by an angle clip 211 carried at one end of a box contact member 212 of angle section pivotally mounted forwardly of gate portions 109 by a pivot connection at 213 to said gate means. A pair of transversely spaced coil springs 214 ensleeved over a pair of upstanding guide bolts 215 on member 191 bias the box contacting member 212 forwardly as indicated by dotted lines in Fig. 7. A box moving on conveyor chains 94 thus first contacts box contact member 212 which pivots about 213 to bring clip 211 into actuating contact with arm 210 of the gate switch means 208.

Out conveyor limit switch means 218 and 219 are mounted on opposite side of plates 135 of the outfeed section 17, one of said switches, for example 218, being adapted to raise gate 21 after a stack has passed over said limit switch means 218 and the other switch means 219 for de-energizing a holding relay to lower gate 20, said latter switch means 219 also serving to prepare the electrical control system for the next stacking cycle. Switch means 218 and 219 respectively include arms 220 and 221 adapted to be contacted by contact elements 222 and 223 fixed on a transverse pivotally mounted rod 224. Rod 224 carries in fixed relation thereon a pair of normally upstanding box contact members 225, said members 225 being similar to box contact member 205 and are normally in up position in the path of a box advanced by conveyor chains 94. Counterweight means 226 carried by rod 224 maintain members 225 in up position and cross member 145 provides stop means for said counterweight means 226 as at 227.

Elevator limit switch means 229 for stopping each pair of aligned flights or box support elements 50 at slightly more than the height of one box may be mounted within a stack frame column 22. Elevator switch means 229 includes a horizontally inwardly projecting contact arm 230 having an end positioned in the zone of the elevator chains 37 so that a box is raised, the flight 50 supporting said box will contact arm 230 to actuate the switch means 229. Arm 230 is contacted by each flight as the elevator chains are intermittently raised in the initial accumulation of boxes in spaced relation in the stacking mechanism.

In the opposite column 22 and near the top thereof is provided a second elevator switch means 232 provided with an inwardly, generally horizontally extending switch contact arm 233. Contact arm 233 is adapted to be contacted by a transverse rod 234 carried by elevator chains 37 in said associated column 22 when the first flights 50 descend to a position slightly below conveyor chains 94 during formation of a stack. Limit switch means 232 causes the elevator chains to stop at such position so that they are ready to be actuated upwardly for the formation of the succeeding stack. In column 22, opposite from the second elevator switch means 232, may be provided a third elevator switch means 236 having a generally horizontally extending switch arm 237 extending into the zone of the associated elevator chains 37. Switch means 236 serves as a safety switch to stop both the elevator chains and the conveyor chains before a box can contact the top of the stacking frame.

Air cylinders 182 and 196 which actuate respectively gates 20 and 21 are controlled by solenoid actuated air valves not shown in the drawings, such air valves being indicated on the schematic wiring diagram at 239 and 240. The stack frame means carries a panel 241 for containing the various electrical connections, switches, and relays of the electrical circuit means and includes as shown on the schematic wiring diagram an automatic and manual selector switch 242, stack height selector switches 243—248 inclusive, a holding switch 250, and a manually operated down switch 251 for lowering the elevator chains in the event the safety limit switch 236 has been actuated to prevent a box from contacting the top of the stack frame.

The exemplary schematic wiring diagram indicates the circuit arrangement for the stacking mechanism by the use of symbols and representations conventional in industry and reference will be made to said wiring diagram in describing the operation of said box stacking mechanism. It is understood other circuit means may be used.

In automatic operation of the stacking mechanism described above, it is understood that a plurality of boxes have been arranged by any suitable means in end-to-end abutting relation on gravity conveyor 112 as diagrammatically shown in Fig. 1. The first box is urged by gravity onto conveyor chains 94. Initially, gate 20 is in down position and gate 21 is in up box stopping position.

The selector switch 242 is turned to automatic position, the stack height selector switch is set to the number of boxes required in the stack (as by selecting a switch from 243 to 248 inclusive), the hold switch 250 is set in off position, and a start button 253 may be pressed for energizing the panel conveyor and motor circuits.

As the first box is advanced into the stacking frame on the infeed conveyor section, it passes over gate 20 which is down and depresses box contacting member 205. The first box is followed by succeeding boxes, all of which are in end-to-end contact. Depression of member 205 actuates gate limit switch means 200 which energizes the solenoid air valve 239 for air cylinder 182 for urging gate 20 into up position. It will be noted in Fig. 3 that gate 20 moves upwardly before the box clears gate 20 and as a result, tilts the first box upwardly out of alignment with its normal direction of travel. The rollers 170 on gate 20 anti-frictionally contact the bottom of the first box and facilitates the tilting upwardly and rolling and sliding movement of the box therefrom. Immediate separation of the first box from the second is thus provided before the leading end face of the second box reaches the up position of gate 20. Gate 20 in closed position blocks and holds the remaining boxes in the infeed section.

The first box continues into the stacking frame and is stopped by gate 21. The first box initially contacts the box contacting member 212 for actuating the gate limit switch means 208. Switch means 208 energizes the elevator motor circuit to cause the elevator chains 37 and the first flight of box support elements 50 to raise the first box in the stack pathway. As the flights ascend, they contact the arm 230 of the first elevator limit switch means 229 which stops the elevator motor and the elevator chains 37 at a preselected proper level which is slightly greater than the height of a box. In such stopped position, the second flight of box support members 50 is in position to receive a second box. The limit switch means 212 also operates a series of counting relays associated with the stack height selector switches 243—248 so as to determine the number of boxes per stack. First elevator limit switch means 229 also de-energizes the solenoid air valve 239 to lower gate 20 to admit a second box to the stack pathway. This sequence of operations is continued until there is positioned in the stack pathway the number of boxes selected by the stack selector switch. The last box of said number of boxes to be stacked remains on the conveyor means and is held thereby in contact against gate 21. The last box is counted because it presses against member 212 of limit switch means 208.

When the selected number of boxes have been accumulated in the stack pathway, the elevator motor is reversed through operation of the limit switch means 208 and the stack selector switch. The boxes are caused to descend to be stacked one upon the other commencing with the last and bottom box positioned on the conveyor chain 94. During stacking, flights 50 slip from between the boxes as the tapered bottom faces of the box support members contact and slide outwardly on the top side edges of the stationary box therebeneath. As the boxes commence to descend, a solenoid actuated air valve 255 actuates the stack aligner air cylinder 80 to cause the stack alignment members 72 to move substantially horizontally inwardly to squeeze and guide the descending boxes into lateral alignment. After the last box comes to rest on the formed stack, the flights 50 continue downwardly until rod 234 contacts arm 233 of elevator limit switch means 232 to stop the elevator motor and with the first flight 50 in position below conveyor chains 94 for start of a second stacking cycle. The elevator limit switch means 232 also actuates the solenoid air valve 240 for retracting gate 21 to down position. Since the conveyor is continuously moving, the stack is moved out of the stack pathway and along the outfeed conveyor section. As the stack passes over box contacting members 225, said members are depressed and cause actuation of limit switch means 218 and 219. Limit switch means 218 causes air valve for the air cylinder 196 to be actuated to raise gate 21 to closed position. Limit switch means 219 deenergizes the air valve for air cylinder 182 to cause the gate 20 to retract to down position. The electrical circuits are reset to starting condition so that the stack cycle can be repeated.

It will thus be readily apparent to those skilled in the art that boxes are fed to the bottom of the stack pathway by movement along a very short distance and less than two box lengths. The box stack member 205 is positioned at the very entrance to the stack pathway so that time required for travel of a box from gate 20 to gate 21 is very short even though the conveyor means is moving at a relatively slow rate of speed. It is important to note the manner of separation of the boxes for intermittent feeding to the stack pathway. Each box admitted by gate 20 is tilted into misalignment with its normal direction of linear travel to allow gate 20 to be interposed btween boxes and to hold the remainder of the boxes at a relatively short distance from the stack pathway.

It will also be noted by those skilled in the art that the stacking frame means is provided with box support flights having sufficient width to accommodate boxes of different width. Regardless of size of the boxes, the boxes are longitudinally positioned in alignment by the gate 21. Since the conveyor means is continuously moving, the box is advanced along the infeed path are always held in a precise longitudinal position against gate 21.

Formation of the stack by descent of accumulated spaced boxes is performed in a manner similar to that described in my co-pending application. It is important to note, however, that the bottom or last box fed to the bottom of the stack pathway is not lifted or moved along the stack pathway but is held at the intersection of the infeed path and the stack pathway. When the stack is formed, retraction of gate 21 permits the boxes to immediately move out of the stack frame means onto the outfeed conveyor section whereby they may be discharged onto suitable box handling means (not shown).

It will be readily understood by those skilled in the art that various modifications and changes may be made in the above stacking mechanism which come within the spirit of this invention, and all such modifications and changes coming within the scope of the appended claims are embraced thereby.

I claim:

1. In a stacking mechanism for boxes and the like, the combination of: frame means providing a vertical stack pathway and a stack discharge opening; elevator means carried by said frame means for raising in spaced relation a plurality of boxes in said stack pathway; a single continuous conveyor means extending across the bottom end of the stack pathway and providing an infeed conveyor section and an outfeed conveyor section; a first gate means in said infeed section to interrupt flow of boxes to said stack pathway; a second gate means on the outfeed section adjacent the stack discharge opening for longitudinally positioning each box; and means on the second gate means responsive to pressure of a box thereagainst to cause actuation of the elevator means whereby each box except the last box of a stack to be formed is lifted by said elevator means.

2. A stacking mechanism as claimed in claim 1 including box counting means operably associated with said means on the second gate whereby a last box of a stack to be formed is held on said conveyor means while said elevator means is reversed and boxes accumulated in said stack pathway are stacked on said last box.

3. A stacking mechanism as claimed in claim 1 including box centering means carried by said infeed section.

4. A stacking mechanism as claimed in claim 1 wherein said first gate means is spaced from said second gate means more than one box length and less than twice a box length.

5. A stacking mechanism as claimed in claim 1 including means to actuate the first gate means to closed position before a box clears said first gate means whereby the trailing end of a box being advanced to the stack pathway is lifted and said first gate means is operable to hold the succeeding box against movement into said stack pathway.

6. In a stacking mechanism for boxes and the like, the combination of: a frame means defining a receiving station, a single vertical stack pathway for a plurality of boxes, and a stack discharge opening; an elevator means on the frame means for supporting a plurality of boxes in spaced relation in said stack pathway; a single, continuously movable conveyor means extending through said frame means and provided with an infeed section and an outfeed section, said infeed section providing an infeed path for boxes, said outfeed section providing an outfeed path for moving a stack of boxes away from said stack pathway through said stack discharge opening; and means to control movement of boxes along said infeed, stack and outfeed pathways including a gate means cooperably associated with the conveyor means at the bottom of the stack discharge opening whereby the last box of a stack is held on said conveyor means at the bottom end of said stack pathway for formation of a stack of boxes thereon.

7. In a stacking mechanism for boxes and the like, the combination of: a frame means defining a receiving station, a single vertical stack pathway for a plurality of boxes, and a stack discharge opening; an elevator means on the frame means for supporting a plurality of boxes in spaced relation in said stack pathway; a single, continuously movable conveyor means extending through said frame means and provided with an infeed section and an outfeed section, said infeed section providing an infeed path for boxes, said outfeed section providing an outfeed path for moving a stack of boxes away from said stack pathway through said stack discharge opening; and means to control movement of boxes along said infeed, stack and outfeed pathways including a gate means at the bottom of the stack discharge opening and box counting means associated with said gate means whereby the last box of a stack is held on said conveyor means at the bottom end of said stack pathway for formation of a stack of boxes thereon.

8. In a stacking mechanism for boxes and the like, the combination of: a frame means defining a receiving station, a single vertical stack pathway for a plurality of boxes, and a stack discharge opening; an elevator means on the frame means for supporting a plurality of boxes in spaced relation in said stack pathway; a single, continuously movable conveyor means extending through said frame means and provided with an infeed section and an outfeed section, said infeed section providing an infeed path for boxes, said outfeed section providing an outfeed path for moving a stack of boxes away from said stack pathway through said stack discharge opening; and means to control movement of boxes along said infeed, stack, and outfeed pathways including a first gate cooperably associated with the infeed conveyor section and a second gate adjacent the receiving station and spaced from the first gate more than one box length and less than two box lengths.

9. In a stacking mechanism for boxes and the like, the combination of: a frame means defining a receiving station, a single vertical stack pathway for a plurality of boxes, and a stack discharge opening; an elevator means on the frame means for supporting a plurality of boxes in spaced relation in said stack pathway; a single, continuously movable conveyor means extending through said frame means and provided with an infeed section and an outfeed section, said infeed section providing an infeed path for boxes, said outfeed section providing an outfeed path for moving a stack of boxes away from said stack pathway through said stack discharge opening; a first gate in said infeed path to space boxes advanced along the infeed path; a second gate at the receiving station to stop a box at the bottom end of the stack path and to longitudinally position said box; and box counting means on the second gate responsive to box pressure thereagainst whereby said last box is held against movement while boxes accumulated in said stack pathway are stacked thereupon.

10. In a stacking mechanism, the combination of: a box infeed section including means for intermittently moving a box to one end of a stack pathway; an outfeed section at the opposite side of the stack pathway; elevator means along said stack pathway for moving boxes received at said one end of said stack pathway in spaced relation to accumulate a selected number of boxes; means to discontinue movement of said elevator means when a last box of a stack is positioned at one end of said stack pathway and to cause said spaced boxes to move toward said last box for stacking said boxes thereon; and means operative when said stack is formed to move said stack on the outfeed section, said infeed and outfeed sections including conveyor means lying in the same plane for movement of boxes therealong, the said last box moving through the stacking mechanism without being raised by the elevator means.

11. In a stacking mechanism for boxes and the like, the combination of: a frame means defining a single vertical stack pathway for a plurality of boxes and provided with a stack discharge opening; elevator means carried by the frame means and extending into said pathway for supporting in spaced relation a plurality of boxes; a single continuously moving conveyor means provided with an infeed section and an outfeed section, said conveyor means extending across said stack pathway with said outfeed section in alignment with said stack discharge opening, said conveyor means including a top lay lying in a horizontal plane, said infeed and outfeed sections of said conveyor means crossing said pathway in the same plane; and means operative to position a box in said stack pathway on said conveyor means for lifting by said elevator means to accumulate a selected number of boxes in spaced relation in said pathway, said operative means including means causing said elevated boxes to descend when a last box of a stack of selected height is positioned on said conveyor means at one end of said pathway.

12. In a stacking mechanism for boxes and the like, the combination of: frame means providing a vertical stack pathway and stack discharge opening; elevator means carried by said frame means for raising a plurality of boxes in said stack pathway; a single continuous conveyor means extending across the bottom end of the stack pathway and providing an infeed conveyor section and outfeed conveyor section; a first gate means in said infeed section to interrupt flow of boxes to said stack pathway; a second gate means on the outfeed section adjacent the stack discharge opening for longitudinally positioning each box; and means on the second gate means responsive to pressure of a box thereagainst to cause actuation of the elevator means whereby each box except the last box of a stack to be formed is lifted by said elevator means.

13. A stacking mechanism as claimed in claim 12 including box counting means operably associated with said means on the second gate whereby a last box of a stack to be formed is held on said conveyor means while said elevator means is reversed and boxes accumulated in said stack pathway are stacked on said last box.

14. A stacking mechanism as claimed in claim 12 including box centering means carried by said infeed section.

15. A stacking mechanism as claimed in claim 12 wherein said first gate means is spaced from said second gate means more than one box length and less than twice a box length.

16. A stacking mechanism as claimed in claim 12 including means to actuate the first gate means to closed position before a box clears said first gate means whereby the trailing end of a box being advanced to the stack pathway is lifted and said first gate means is operable to hold the succeeding box against movement into said stack pathway.

17. In a stacking mechanism for boxes and the like, the combination of: a frame means defining a receiving station, a single vertical stack pathway for a plurality of boxes, and a stack discharge opening; an elevator means on the frame means for supporting a plurality of boxes in said stack pathway; a single, unidirectional continuously movable conveyor means extending through said frame means in the same plane and provided with an infeed section and an outfeed section, said infeed section providing an infeed path for boxes, said outfeed section providing an outfeed path for moving a stack of boxes away from said stack pathway through said stack discharge opening; and means to control movement of boxes along said infeed, stack and outfeed pathways including a gate means cooperably associated with the conveyor means at the bottom of the stack discharge opening whereby the last box of a stack is held against movement with said conveyor means and at the bottom end of said stack pathway for formation of a stack of boxes thereon.

18. In a stacking mechanism, the combination of: a box infeed section including means for intermittently moving a box to one end of a stack pathway; an outfeed section at the opposite side of the stack pathway; elevator means along said stack pathway for moving boxes received at said one end of said stack pathway to accumulate a selected number of boxes; means to discontinue movement of said elevator means when a last box of a stack is positioned at one end of said stack pathway and to cause said boxes to move toward said last box for stacking said boxes thereon; and means operative when said stack is formed to move said stack on the outfeed section, said infeed and outfeed sections including a continuously movable conveyor means lying in the same plane for movement of boxes therealong in one direction, the last box remaining on the conveyor means at the stack pathway without being raised by the elevator means.

19. In a stacking mechanism for boxes and the like, the combination of: frame means providing a vertical stack pathway and a stack discharge opening; elevator means carried by said frame means for raising a plurality of boxes in said stack pathway; conveyor means operatively cooperating with the bottom end of the stack pathway and providing an infeed conveyor section and an outfeed conveyor section; a first gate means in said infeed section to interrupt the flow of boxes to said stack pathway; a second gate means on the outfeed section adjacent the stack discharge opening for longitudinally positioning each box at the bottom of the stack pathway; and means on the second gate means responsive to pressure of a box thereagainst to cause actuation of the elevator means whereby each box except the last box of a stack to be formed is lifted by said elevator means and the last box is restrained against movement by the second gate means and remains on the conveyor means.

20. In a stacking mechanism for boxes and the like, the combination of: a frame means defining a receiving station, a single vertical stack pathway for a plurality of boxes, and a stack discharge opening; an elevator means on the frame means for supporting a plurality of boxes in said stack pathway; conveyor means operatively cooperating with the bottom end of the stack pathway and providing an infeed conveyor section and an outfeed conveyor section having common portions at the stack pathway; said infeed section providing an infeed pathway for boxes, said outfeed section providing an outfeed path for moving a stack of boxes away from said stack pathway through said stack discharge opening; and means to control movement of boxes along said infeed, stack and outfeed pathways including a gate means cooperably associated with the conveyor means at the bottom of the stack discharge opening whereby the last box of a stack is held on said conveyor means at the bottom end of said stack pathway for formation of a stack of boxes thereon.

21. In combination with a box stacking mechanism, conveyor means providing an infeed path and an outfeed path for boxes, a single vertical stack pathway for a plurality of boxes between said infeed and outfeed paths; elevator means operatively associated with said vertical pathway for supporting a plurality of boxes in said pathway; and gate means at said stack pathway operable to longitudinally position boxes for stacking by said elevator means, to count the number of boxes to be stacked, to reverse the direction of the elevator means when the selected height of the stack is reached, and to release a stack along said outfeed path.

References Cited in the file of this patent

UNITED STATES PATENTS

| | | |
|---|---|---|
| 2,550,587 | Neja | Apr. 24, 1951 |
| 2,602,554 | Griffith | July 8, 1952 |
| 2,609,111 | Daves | Sept. 2, 1952 |
| 2,641,371 | Webster | June 9, 1953 |
| 2,675,119 | Birch | Apr. 13, 1954 |
| 2,687,813 | Verrinder | Aug. 31, 1954 |
| 2,748,917 | Rawe | June 5, 1956 |
| 2,857,040 | Campbell | Oct. 21, 1958 |